Figure 1:
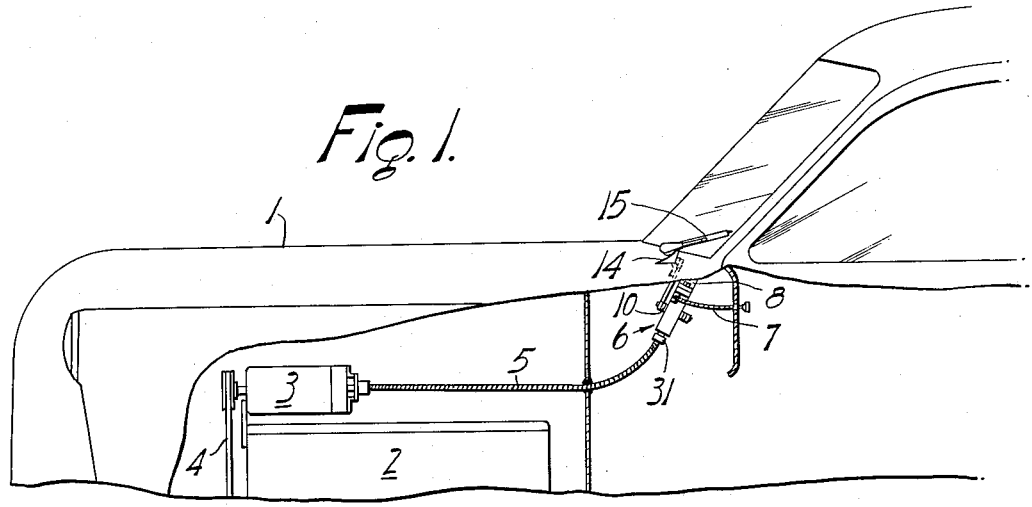

June 5, 1956 — R. DEIBEL — 2,748,617
WINDSHIELD CLEANER DRIVE
Filed Jan. 19, 1951 — 2 Sheets-Sheet 1

INVENTOR.
Raymond Deibel
BY Bean, Brooks, Buckley & Bean
ATTORNEYS

INVENTOR.
Raymond Deibel
BY
Bean, Brooks, Buckley & Bean
ATTORNEYS

United States Patent Office

2,748,617
Patented June 5, 1956

2,748,617

WINDSHIELD CLEANER DRIVE

Raymond Deibel, East Aurora, N. Y., assignor to Trico Products Corporation, Buffalo, N. Y.

Application January 19, 1951, Serial No. 206,900

12 Claims. (Cl. 74—405)

This invention relates to an improved mechanical windshield cleaner and more particlarly to a new and useful mechanism by which the wiper may be operated in a practical manner from the vehicle power plant.

It is an object of this invention to provide an improved wiper arresting means in the driving connection between the vehicle motive means and the windshield wiper blade, which wiper arresting means includes a rotatable spur gear mounted in fixed position and a pivoted worm gear adapted for disengageable driving engagement therewith.

It is another object of this invention to provide a novel means whereby said wiper may be quickly and freely arrested and parked at the will of the operator of the vehicle.

It is a further object of this invention to provide a novel locking means whereby the wiper mechanism will automatically lock in running position and remain locked therein until released to park position by the operator of the vehicle.

An additional object of the present invention is to provide a new and useful wiper operating mechanism for a mechanical windshield cleaner, which mechanism is simple and inexpensive in construction, positive in operation, and easily manipulated at the will of the operator of the vehicle.

With the foregoing and other objects in view, the present invention consists of certain novel features and combinations of parts to be more fully described in the ensuing detailed description.

Figures 2, 3:
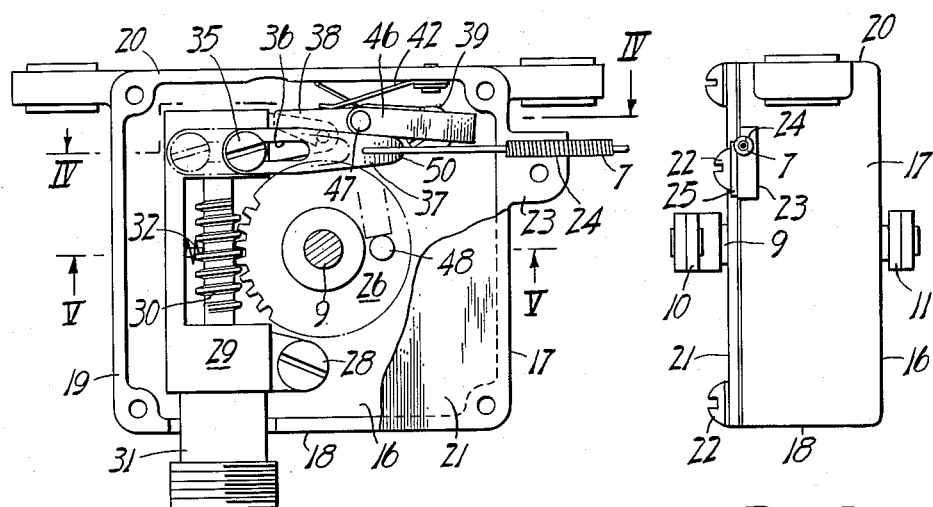
Figure 4:
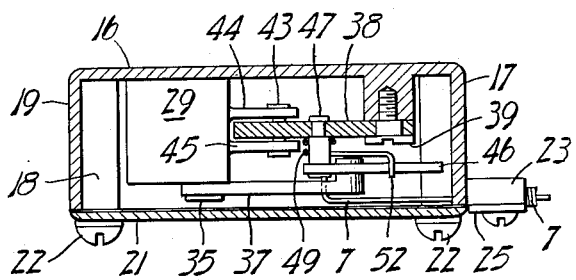
Figure 5:
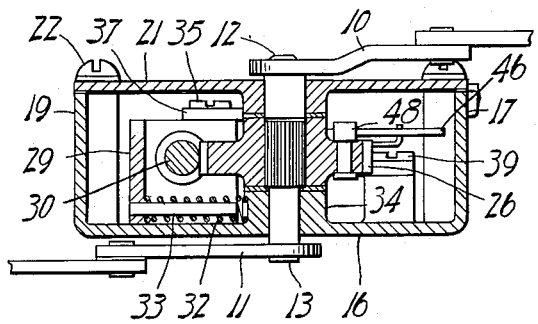
Figure 6:
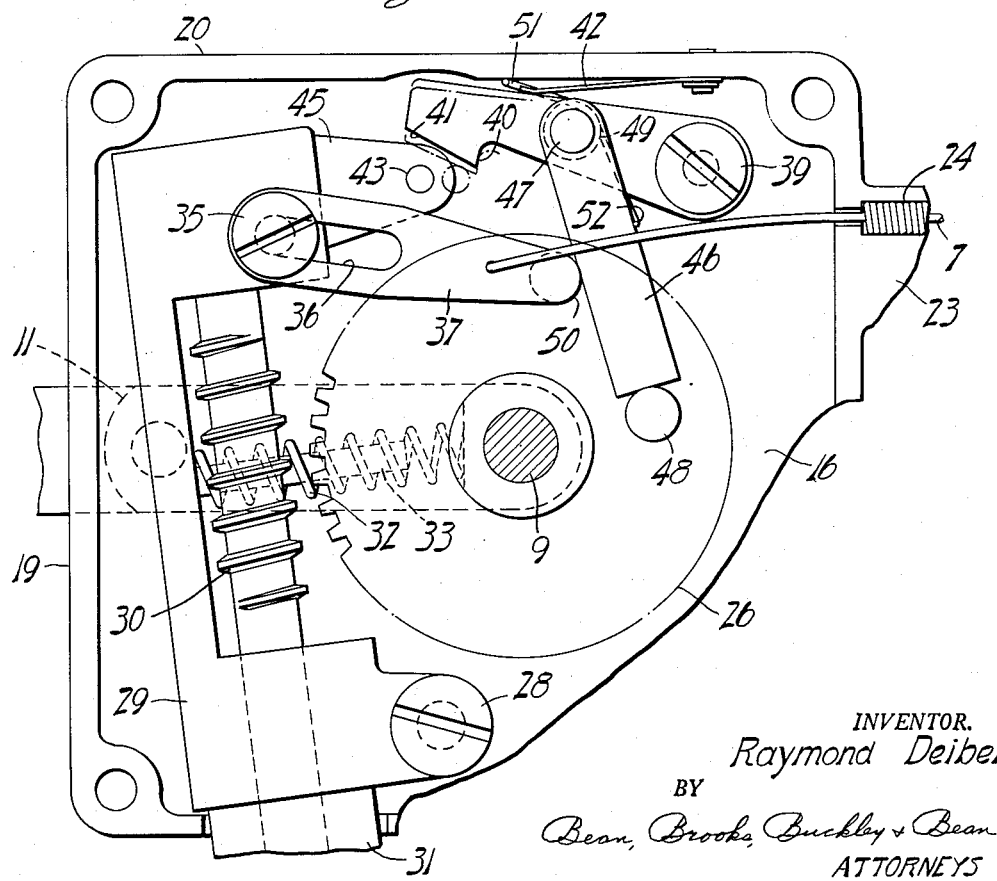

For a more complete understanding of the present invention, reference is hereby made to the accompanying drawings in which like reference numerals denote like parts and in which:

Fig. 1 is a side view of the front portion of a vehicle showing the windshield cleaner mounted in place thereon and showing the driving connection between the vehicle generator and the windshield cleaner actuating means, Fig. 2 is a side plan view of the gearbox containing the wiper operating mechanism, Fig. 3 is a view of the gearbox with its front cover plate removed and showing the mechanism in running position, Fig. 4 is a top view, partly in section, taken along the line IV—IV of Fig. 3, Fig. 5 is a sectional view taken along the line V—V of Fig. 3, and Fig. 6 is a view in side elevation showing the mechanism in arrested position.

In mechanical windshield cleaners having a driving connection with the motive means of the vehicle, it is obviously necessary to have some type of operating mechanism therefor which is under the control of the operator of the vehicle whereby he can initiate and arrest a windshield cleansing operation at will. This mechanism should be simple in nature, so as to avoid a complex structure which will be expensive to build and to repair, and at the same time should be constructed so as to provide a positive operation which will initiate a windshield cleansing operation substantially instantaneously, and arrest it immediately at the conclusion of a single back and forth motion of the wiper blade. In addition, the operating mechanism should include means for releasably but securely locking the same in running position, and means whereby a windshield cleansing operation may be conveniently and freely initiated and arrested at the will of the operator.

Prior mechanical windshield cleaners have relied heavily on friction clutches which are under the control of the driver of the vehicle. However, friction clutch arrangements are apt to be unsatisfactory because a certain amount of slippage is bound to occur, at least when engaging and disengaging the clutch. This slippage, even though limited in amount, precludes the desired positive operation. In addition, the discs or drums and shoes of a friction clutch are subject to wear and must be replaced periodically to ensure satisfactory operation. Further, in an effort to provide the desired long life and positive operation, friction clutch wiper operating mechanisms often require a relatively complex structure, which results in greater expense to the owner and user thereof. Other types of prior wiper operating mechanisms possess corresponding disadvantages.

The present invention provides a novel wiper operating and arresting mechanism in the form of a disengageable coupling which includes all of the above-mentioned features and advantages, and avoids many of the disadvantages and objectionable features of prior wiper operating mechanism.

Referring to the accompanying drawing, there is shown an automotive vehicle 1 having a conventional motor 2 and a generator 3 which is driven by motor 2 through the usual fan belt arrangement 4. Connected at one end to generator 3, so as to be rotatably driven thereby, is a cable 5. Cable 5 is connected at its other end to the detachable coupling of the present invention, which coupling is shown as being contained within a gearbox 6. Also attached to the detachable coupling in gearbox 6 is a Bowden wire 7, which Bowden wire extends into the driver's compartment of the vehicle, as shown, whereby the driver can actuate the detachable coupling. Gearbox 6 is attached to the vehicle body as by a bracket 8. Extending through gearbox 6 is a drive shaft 9 having drive arms 10, 11 attached to the ends thereof as at 12, 13. Drive arms 10, 11 are connected in the usual manner to the windshield cleaner mounting 14 whereby to impart an oscillatory motion to the windshield wiper 15.

Gearbox 6 includes a base member having a rear wall 16, and four side walls 17, 18, 19 and 20. A front cover plate 21 is provided for the gearbox and is attached thereto as by bolts 22. Extending from side wall 17 of gearbox 6 is an ear 23 having a groove 24 therein. Front cover plate 21 has a corresponding ear 25 which, together with ear 23, forms a passageway for the reception of Bowden wire 7. One of said bolts 22 extends through said ears 23 and 25.

Mounted within gearbox 6, and on drive shaft 9, is a spur gear 26. Drive shaft 9 has a serrated portion 27 on which spur gear 26 is secured with a tight fit. Pivotally mounted within gearbox 6, as by means of a pivot pin 28, is a saddle element 29 in which is journaled worm gear 30. Worm gear 30 is attached to cable 5 by means of a connection 31, and the pivotal mounting of saddle 29 is such that worm gear 30 can be pivoted into driving engagement with spur gear 26. Worm gear 30 is normally biased out of engagement with spur gear 26 by means of compression spring 32 extending between saddle 29 and a hub 34 which forms a part of rear wall 16 and in which one end of shaft 9 is journaled. Compression spring 32 is held in proper position by a guide pin 33 mounted on saddle 29. The junction between walls 19 and 20 forms a stop which limits the counter-clockwise rotation of saddle 29 about pivot pin 28.

A pin 35 is attached to one side of the upper end of saddle 29, and this pin extends through a slot 36 formed in one end of actuating lever 37. At the other end of actuating lever 37 is attached one end of a Bowden wire 7.

Thus it will be seen that whenever motor 2 is running, it will drive generator 3 which in turn drives cable 5 to impart a constant rotation to worm gear 30. When the driver of the vehicle desires to start a windshield cleansing operation, he merely pulls outwardly on Bowden wire 7 which acts through actuating lever 37, pin 35 and saddle 29, and against the action of compression spring 32, to pivot rotating worm gear 30 into operative driving engagement with spur gear 26. The rotating worm gear immediately imparts a rotary motion to spur gear 26 in the direction of the arrow shown in Fig. 3, and spur gear 26 acts through drive shaft 9 and drive arms 10, 11 to impart an oscillatory motion to windshield wiper 15. In this way the present invention provides for a positive and immediate starting of the windshield cleansing operation.

In addition, means are provided for automatically locking worm gear 30 in operative engagement with spur gear 26. This means include a latch 38 which is pivotally mounted in gearbox 6 by means of a pivot pin 39. Latch 38 is provided with a shoulder 40 on its bottom edge, and an inclined surface 41 extending from said shoulder to the outer end of said latch. A leaf spring 42, secured at one end to wall 20 of gearbox 6 and bearing at its other end against the top edge of latch 38, acts to bias the latch in a downward direction. A lock pin 43 is mounted between two ears 44, 45 extending from the upper end of saddle 29. Thus, as the operator pulls upon Bowden wire 7 to engage worm gear 30 and spur gear 26, lock pin 43 will cam against inclined surface 41 of latch 38 until the latter drops downwardly under the action of spring 42 with shoulder 40 bearing against lock pin 43. This action is shown in dotted lines in Fig. 6. In this position, worm gear 30 is locked in operative engagement with spur gear 26.

The locking means is released by means of a release arm 46 pivotally mounted on latch 38 as by pivot pin 47, and cooperating with a stop pin 48 which is mounted on spur gear 26. Release arm 46 is biased in a downward direction by means of a torque spring 49 which is mounted around pivot pin 47 and which causes release arm 46 to bear against the curved inwardly projecting end 50 of actuating lever 37. One end 51 of torque spring 49 bears upwardly against wall 20 of gearbox 6, and the other end 52 of said spring bears downwardly against the upper edge of release arm 46. When release arm 46 is projected into the path of stop pin 48, it forces latch 38 upwardly and releases the locking engagement of shoulder 40 with lock pin 43.

The operation of the disengageable coupling is as follows. As previously explained, worm 30 rotates constantly whenever motor 2 is running. Starting from the disengaged position of Fig. 6, let it be assumed that the operator wishes to engage the coupling and initiate a windshield cleansing operation. He does this by pulling on Bowden wire 7. Bowden wire 7 in turn exerts a pull on actuating arm 37, pin 35 and saddle 29 to pivot rotating worm 30 clockwise into driving engagement with spur gear 26 which causes rotation of spur gear 26 and consequently actuation of windshield wiper 15. At the same time, curved end 50 of the actuating arm 37 bears against release arm 46 to move the same counter-clockwise against the influence of torque spring 49 and out of the path of stop pin 48. This permits latch 38 to pivot counter-clockwise under the influence of spring 42 until it contacts lock pin 43. The clockwise motion of saddle 29 causes lock pin 43 to cam against the inclined surface 41 of latch 38 until the latter drops into position with shoulder 40 bearing against lock pin 43. In this position, which is shown in Fig. 3, rotating worm 30 is locked in engagement with spur gear 26 and the windshield cleansing operation will continue until the operator desires to stop the same. It will be noted that the curved end 50 of actuating arm 37 bears against release arm 46 to block the latter out of the path of stop pin 48.

To stop the windshield wiper operation, the operator need only push in on Bowden wire 7. This causes actuating arm 37 to be pushed inwardly with pin 35 sliding along groove 36. At the same time, release arm 46 is permitted to pivot in a clockwise direction under the influence of torque spring 49, as shown in dotted lines in Fig. 3. Release arm 46 will then project into the path of stop pin 48 which, due to the counter-clockwise rotation of spur gear 26, will act to force release arm 46 and consequently latch 38 upwardly, thus breaking the locking engagement of lock pin 43 with shoulder 40. This will release saddle 29 and rotating worm 30 for counter-clockwise movement away from spur gear 26 under the influence of compression spring 32. At this point, spur gear 26 immediately ceases to rotate and the windshield cleansing operation stops. Saddle 29 continues to move in a counter-clockwise direction until it abuts the junction of walls 19 and 20. In this manner the windshield wiper is positively stopped within one revolution of spur gear 26. Stop pin 48 is so located on spur gear 26 that when it forces release lever 46 upwardly and comes to a stop, the wiper blade will be in its inner position along the bottom edge of the windshield. The coupling remains in disengaged position because of compression spring 32, and will so remain until engaged by the operator.

Thus it will be seen that the present invention provides a new and useful disengageable coupling for mechanical windshield wipers, which coupling is simple and practical in construction, but at the same time positive and efficient in operation.

Having fully disclosed what is believed to be a preferred embodiment of this invention, and having completely described the operation thereof, what is claimed as new is:

1. In a windshield cleaner including an oscillatable wiper and a rotary drive therefor, transmission means for operatively connecting said wiper to its drive and including meshing gears, a movable support for one of said gears enabling displacement of one gear from the other, and preset parking means operable by the driven one of said gears for moving said support to arrest the wiper in a predetermined position.

2. A windshield cleaner transmission means for operatively connecting an oscillatable wiper to a rotary drive comprising meshing gears, a movable support for one of said gears enabling displacement of one gear from the other, means normally biasing said support to its gear displacing position, and preset parking means operable by the driven one of said gears for moving said support to arrest the wiper in a predetermined position.

3. A windshield cleaner power transmission comprising, a disengageable coupling arranged to be interposed between a drive and a wiper and having a shaft journaled for rotation, means for connecting the ends of said shaft to a wiper, a first gear means secured to said shaft, a second gear means journaled for rotation and adapted for connection to a drive, means permitting movement of said second gear means into and out of meshing engagement with said first gear means, means normally biasing said gear to disengaged position, manually operable means for moving said gear to engaged position to initiate a windshield cleaning operation, holding means automatically securing said gear in engaged position, and means on one of said gear means for releasing said holding means to arrest the windshield cleansing operation.

4. A windshield cleaner mechanism comprising, a first and second gear means rotatably journaled for movement relative to each other, means for connecting said first gear means to a rotary drive and said second gear means to a wiper, manually operable means adapted to move said gear means into meshed engagement to initiate a windshield cleansing operation, latch means automatically locking said gear means in meshed engagement, and means cooperating with one of said gear means to release said latch means for disengagement of said gear means to arrest said windshield cleansing operation.

5. A mechanical windshield cleaner power transmission comprising a disengageable coupling including a first gear adapted for connection to a wiper element, a support means pivotally mounted for movement relative to said first gear, a second gear carried by said support means and pivotal therewith into meshing engagement with said first gear, means for driving said second gear from the generator of a vehicle, manually operable actuating means attached to said support means whereby to engage and disengage said two gears, latch means adapted to lock said gears in engaged position, and means cooperating with said first gear to release said latch means whereby to permit disengagement of said gears.

6. A power transmission comprising a disengageable coupling having a rotatably journaled shaft, a spur gear mounted on said shaft, a pivotally mounted support means, a worm gear rotatably journaled in said support means, means for driving said worm gear, manually operable means adapted to pivot said worm gear into driving engagement with said spur gear, spring biased latch means adapted to lock said gears in engaged position, a stop pin mounted on said spur gear, a lever pivotally mounted on said latch means and spring biased in a downward direction so as to project into the path of said stop pin whereby to release said latch means, and means adapted to hold said lever in a retracted position when said manually operable means has been operated to drivingly engage said gears.

7. In a windshield cleaner of the type comprising a drive connected to the generator of a vehicle and a wiper operable thereby, a disengageable coupling adapted to be interposed between said drive and said wiper and having a rotatably journaled first gear adapted for driving connection with said wiper, a rotatably journaled second gear arranged to be driven by said drive, said second gear being mounted for movement relative to said first gear, a manually operable actuating arm secured to said second gear by means of a pin and slot connection for movement of said second gear into meshed engagement with said first gear whereby to initiate a windshield cleansing operation, a pivoted latch means spring biased to a holding position wherein said second gear is locked in meshed engagement with said first gear, a stop pin on said first gear, and a release lever pivotally mounted on said latch means and biased to project downwardly into the path of said stop pin whereby to cooperate therewith in moving said latch means from its holding position to arrest said windshield cleansing operation and park said wiper, said actuating arm being adapted to move said release lever out of the path of said stop pin upon operation of said manually operable means to engage said gears.

8. A power transmission comprising, a disengageable coupling having a rotatably journaled drive shaft, a spur gear secured on said drive shaft, a support mounted for movement relative to said spur gear, a worm gear rotatably journaled in said support and movable therewith into meshing engagement with said spur gear, means for driving said worm gear, a latch means cooperating with said support to lock said gears in meshing engagement, manually operable actuating means secured to said support for moving said gears into meshing engagement, and release means under the control of said manually operable means and cooperating with one of said gear means to move said latch means out of its locking position whereby to disengage said gears.

9. A windshield cleaner power transmission comprising, a first gear adapted for driving connection to a wiper, a pivotally mounted support movable relative to said first gear, a second gear carried by said support for movement into engagement with said first gear, means normally biasing said gears to disengaged position, said second gear being adapted for connection to a drive, manually operable actuating means secured to said support with a lost motion connection and adapted to move said gears into driving engagement, a lock pin on said support, a pivotally mounted latch, means biasing said latch into engagement with said lock pin to lock said gears in driving engagement, a stop pin on said first gear, and means on said latch cooperating with said manually operable means to permit said latch to engage said lock pin and cooperating with said stop pin to disengage said latch and said lock pin whereby to disengage said gears.

10. A windshield cleaner transmission mechanism comprising, a drive worm, a driven gear arranged for meshing with said worm, a carrier movable relative to said driven gear and forming a support for said worm whereby said worm can be moved out of mesh with said driven gear, means normally biasing said carrier to move said worm out of mesh with said driven gear, manually operable means for selectively moving said carrier to mesh said worm with said driven gear, holding means releasably securing said carrier in a position meshing said worm with said driven gear, and preset parking means automatically operable by said driven gear under the control of said manually operable means for releasing said holding means to enable said worm to move out of mesh with said driven gear under the influence of said biasing means.

11. A windshield cleaner mechanism comprising, a drive worm, a driven gear meshing with said worm and arranged for connection to a wiper, a carrier movable relative to said driven gear and forming a support for said worm whereby said worm can be moved out of mesh with said driven gear to arrest the wiper, and timing means including manually operable conditioning means for so moving said carrier to automatically arrest the wiper in a predetermined parked position.

12. A windshield cleaner mechanism comprising, a disengageable coupling having a first member connected to drive a wiper, a second member arranged for operative engagement with said first member and connected to a source of driving power, means mounting one of said members for movement relative to the other of said members, means biasing said members to disengaged position, mechanical latch means for releasably locking said members in engaged position, manually operable means for mechanically engaging said members, and means including said manually operable means for releasing said latch means to disengage said members.

References Cited in the file of this patent

UNITED STATES PATENTS

| 1,146,995 | Bossert | July 20, 1915 |
| 1,288,503 | Burnham | Dec. 24, 1918 |
| 1,309,902 | Martyn | July 15, 1919 |
| 1,327,129 | Wolff | Jan. 6, 1920 |
| 1,639,428 | Daly | Aug. 16, 1927 |
| 2,538,432 | Sivacek | Jan. 16, 1951 |

FOREIGN PATENTS

| 461,255 | Great Britain | Feb. 15, 1937 |